Jan. 21, 1930.    L. G. ABRAHAM    1,744,031

MEASUREMENT OF ACTIVE BALANCE COMPONENTS

Filed Oct. 30, 1928

$d$ = seconds required for current of frequency $f$ to traverse shortest of repeater sections.

$D$ = average number seconds required for current of frequency $f$ to traverse a repeater section.

$n$ = number of repeater sections in complete circuit.

INVENTOR
*L. G. Abraham*
BY
ATTORNEY

Patented Jan. 21, 1930

1,744,031

UNITED STATES PATENT OFFICE

LEONARD G. ABRAHAM, OF TEANECK, NEW JERSEY, ASSIGNOR TO AMERICAN TELEPHONE AND TELEGRAPH COMPANY, A CORPORATION OF NEW YORK

MEASUREMENT OF ACTIVE-BALANCE COMPONENTS

Application filed October 30, 1928. Serial No. 316,025.

This invention relates to the measurement of balances in two-way transmission circuits, and more particularly to methods of and means for measuring any component of the active balance of a network against the line in a long repeatered transmission circuit.

At a repeater on a long working two-wire circuit, the active balance of a network against the line is its balance when all the repeaters are giving normal gain, and it depends not only on the passive balance of the network against its line section but also upon the balances at other repeater points as seen through various losses and gains. This active balance may be considered as made up of several components. Each of these components is the passive balance at one repeater point as seen through the intermediate losses and gains of the circuit. The object of the invention is the measurement of any one of these components of the active balance.

In general, the applicant, in accomplishing the desired result, sends a spurt of alternating current of a certain frequency into the line during a period of time determined (for that frequency) by the length of the shortest repeater section of the circuit, repeats this operation at intervals the length of which is determined by the total length of the circuit, selects the current returned from the line after a delay determined by the distance from the measuring point to the repeater section associated with the particular balance component to be measured, makes a differential measurement of a quantity proportional to the current sent into the line and a quantity proportional to the selected current returned over the line, and determines the value of the balance component from the results of this differential measurement.

Figure 1:
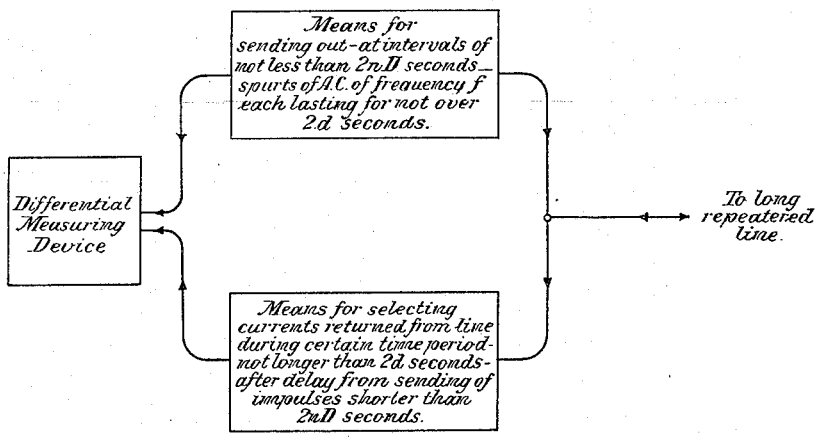

The invention will be clearly understood when the following description is read with reference to the accompanying drawing. Figure 1 of the drawing indicates schematically the applicant's measuring method, while Fig. 2 shows diagrammatically and in part schematically the apparatus which is associated with the transmission circuit to effect the measurement of a component of the active balance.

With reference first to Fig. 1 of the drawing, let $d$ represent the number of seconds required for current of a frequency $f$ to traverse the shortest of the repeater sections of the circuit; let D represent in seconds the average time required for current of the frequency $f$ to traverse a repeater section; and let $n$ represent the number of repeater sections in the complete circuit.

A short spurt of the frequency $f$ at which it is desired to measure the active balance is sent into the circuit from the measuring point for not over $2d$ seconds. This operation is repeated at intervals of not less than $2n$D seconds. Accordingly, after one spurt has been sent into the line no further current will be sent out until the farthest echo from the circuit has been returned to the measuring point. Each component of the active balance will return a current which is delayed from the adjacent repeater section by approximately 2D seconds as an average. Therefore, if second order effects are disregarded, any component of the active balance may be selected if a delay period is chosen the length of which is determined (for the particular frequency) by the distance from the measuring point to the repeater section associated with that component. Accordingly, means must be provided at the measuring point for selecting the current returned from the line over a period $2d$ seconds long after a delay from the sending of the impulse into the line which is some period shorter than $2n$D seconds. If, now, a quantity proportional to the current sent into the line and another quantity proportional to the selected returned current are put into a differential measuring device, the difference between the two quantities is indicated, and the received current may be amplified or attenuated to bring the indication of the differential measuring device to zero. It will now readily be understood that the amount of amplification or attenuation found necessary to equalize the two quantities gives the measure of the particular component of the active balance which it is desired to determine.

Figure 2:
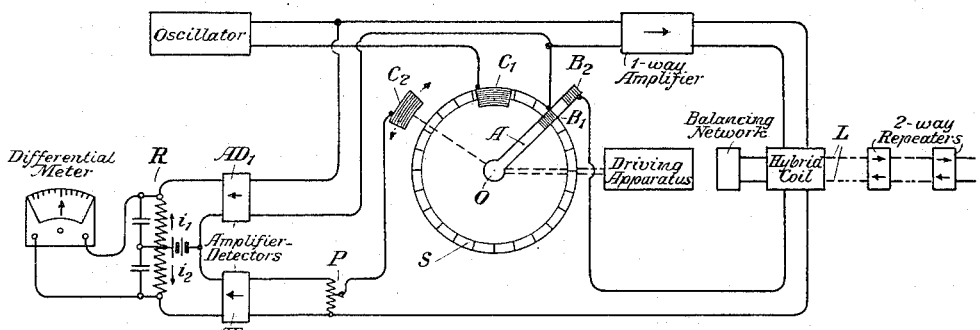

With reference to Fig. 2 of the drawing, there will now be described a suitable arrangement for accomplishing the balance measurement of a network against the line L, which includes a plurality of two-way repeaters, in accordance with the method outlined above. A commutator arm A is rotated around the center O in $2nD$ seconds by the operation of suitable driving apparatus with which it may be connected by a shaft. This arm A carries two brushes $B_1$ and $B_2$. Brush $B_1$ connects with contact $C_1$ for $2d$ seconds once in each rotation. This effects a connection between the oscillator and the hybrid coil and causes a spurt of frequency $f$ to be sent into the line over a period of $2d$ seconds, this sending operation being repeated every $2nD$ seconds. Likewise, as a result of this connection a similar spurt of alternating current is sent from the oscillator into the amplifier-detector $AD_1$. When the current due to unbalance is returned from the line, it is transmitted to the amplifier-detector $AD_2$ when brush $B_2$ is on contact $C_2$. The contact $C_2$ has the same angular length as contact $C_1$ and is so arranged that it may be rotated about the center O to any position on the scale S. It will now be evident that if the contact $C_2$ is properly positioned the result is the selection of a time period $2d$ following a selected delay from the start of the sending impulse. The delay period selected corresponds to the distance from the measuring point to the repeater section associated with the particular balance component. The returned current is, of course, detected in the amplifier-detector $AD_2$.

A battery is associated with a resistance R and the amplifier-detectors $AD_1$ and $AD_2$, as shown in Fig. 2. Accordingly, mutually opposing currents $i_1$ and $i_2$ flow through the resistance R from amplifier-detectors $AD_1$ and $AD_2$, respectively. As will be clear to those skilled in the art, the current impressed upon the differential meter connected as shown in Fig. 2 is the difference between the currents $i_1$ and $i_2$. In order to bring the indication of the differential meter to zero, the potentiometer P may be operated to introduce the necessary amplification or attenuation in the receiving branch of the circuit. Further, it will be understood by those skilled in the art that the amount of amplification or attenuation may give the measure of the active balance component chosen for determination.

It may be necessary, in certain cases at least, to introduce into the receiving branch of the circuit or elsewhere suitable delay circuits or current storing devices, in order to obtain a proper differential measurement. One desirable arrangement is that shown in Fig. 2, in which a condenser is bridged across each part of the resistance R of the meter circuit.

The one-way amplifier shown in the transmitting branch of the circuit is included for the purpose of preventing the returned current from passing into the amplifier-detector $AD_1$.

While the invention has been disclosed in a specific form for the purpose of illustration, it is to be understood that it is capable of embodiment in many and widely different forms within the scope of the appended claims.

What is claimed is:

1. The method of measuring, in a transmission circuit including a plurality of repeaters, the balance at a given repeater point as seen from the measuring point, which consists in sending into the circuit from the measuring point a series of alternating current impulses, impressing on a differential measuring device a quantity proportional to the current sent into the circuit, impressing on said measuring device a quantity proportional to the current returned over the circuit from the given repeater point, and determining the particular balance from the difference indicated by said measuring device.

2. The method of measuring, in a transmission circuit including a plurality of repeaters, the balance at a given repeater point as seen from the measuring point, which consists in sending into the circuit from the measuring point a series of alternating current impulses, impressing on a differential measuring device a quantity proportional to the current sent into the circuit, impressing on said measuring device a quantity proportional to the current returned over the circuit from the given repeater point, effecting a regulation to produce a zero indication on the differential measuring device, and determining the value of the particular balance component from the amount of regulation effected.

3. The method of measuring, in a transmission circuit including a plurality of repeaters, the balance at a given repeater point as seen from the measuring point, which consists in sending into the circuit from the measuring point spurts of alternating current of a given frequency over a time period determined by the length of the shortest repeater section, repeating this sending operation at intervals the length of which is not less than the time of transmission over twice the total length of the circuit, impressing on a differential measuring device a quantity proportional to the current sent into the line, selecting the currents returned over the line from the given repeater point, impressing on said measuring device a quantity proportional to the selected returned current, and determining the particular balance from the difference indicated by said measuring device.

4. In a transmission circuit including a plurality of repeaters, the method of measuring any component of the active balance of a network against the line which consists in sending a spurt of alternating current of a given frequency into the line during a period of time determined by the length of the shortest repeater section of the circuit, repeating this operation at intervals the length of which is at least twice the time of transmission over the total length of the circuit, selecting the current returned from the line after a delay determined by the distance from the measuring point to the repeater section associated with the particular balance component, making a differential measurement of a quantity proportional to the current sent into the line and a quantity proportional to the selected current returned over the line, and determining the value of the balance component from the measure so obtained.

5. In association with a two-way transmission circuit including a plurality of repeaters, an arrangement for measuring the balance at a given repeater point as seen from the measuring point, said arrangement comprising means for sending into the circuit from the measuring point a series of alternating current impulses of a given frequency, each impulse lasting over a period not greater than $2d$ and successive impulses occuring at intervals of not less than $2nD$, a differential measuring device, means for impressing on said measuring device a quantity proportional to the current sent into the circuit, and means for impressing on said measuring device a quantity proportional to the current returned over the circuit from the given repeater point, $d$ representing the number of seconds required for a wave of the given frequency to traverse the shortest repeater section of the circuit, $D$ representing the time required for a wave of the given frequency to traverse the average length of the repeater sections, and $n$ representing the number of repeater sections included in the circuit.

6. In association with a two-way transmission circuit including a plurality of repeaters, an arrangement for measuring the balance at a given repeater point as seen from the measuring point, said arrangement comprising means for sending into the circuit from the measuring point a series of alternating current impulses of a given frequency, each impulse lasting over a period not greater than $2d$ and successive impulses occuring at intervals of not less than $2nD$, a differential measuring device, means for impressing on said measuring device a quantity proportional to the current sent into the circuit, means for impressing on said measuring device a quantity proportional to the current returned over the circuit from the given repeater point, $d$ representing the number of seconds required for a wave of the given frequency to traverse the shortest repeater section of the circuit, $D$ representing the time required for a wave of the given frequency to traverse the average length of the repeater sections, and $n$ representing the number of repeater sections included in the circuit, and means for adjusting the current returned over the circuit from the given repeater point to a value equal to the value of the current sent into the circuit, whereby the measure of the particular balance component may be obtained.

In testimony whereof, I have signed my name to this specification this 24th day of October, 1928.

LEONARD G. ABRAHAM.